June 11, 1957     D. A. SOLLEY, JR., ET AL     2,795,691
ILLUMINATED REFRIGERATOR COMPARTMENT
Filed Nov. 19, 1954
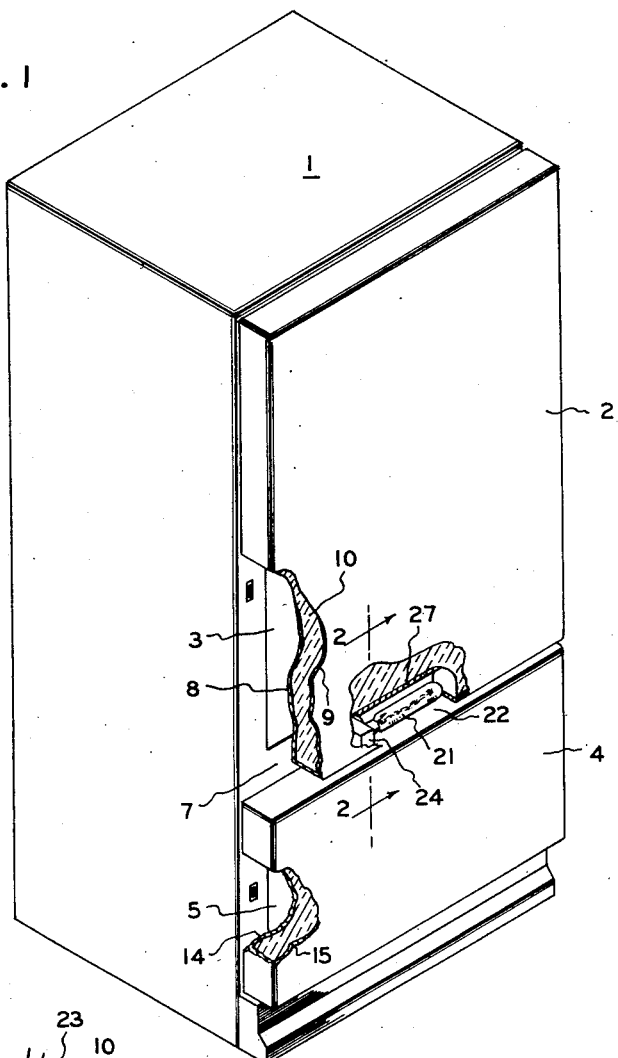
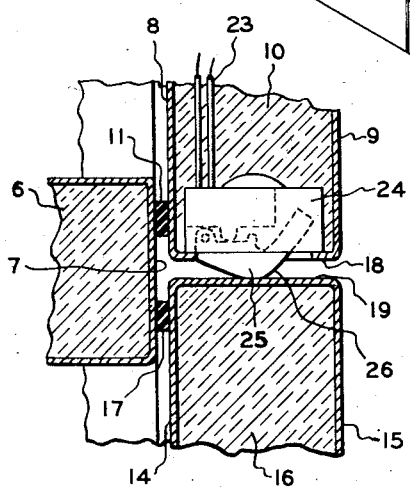
*INVENTOR.*
DOUGLAS A. SOLLEY, JR.
& JULIUS B. HORVAY
BY
THEIR ATTORNEY

United States Patent Office 2,795,691
Patented June 11, 1957

---

2,795,691

ILLUMINATED REFRIGERATOR COMPARTMENT

Douglas A. Solley, Jr., Erie, Pa., and Julius B. Horvay, Louisville, Ky., assignors to General Electric Company, a corporation of New York Application November 19, 1954, Serial No. 469,884

2 Claims. (Cl. 240—4)

---

The present invention relates to a lighting arrangement for a refrigerator storage compartment and is particularly concerned with means for lighting the lower freezer compartment of a two compartment refrigerator.

Two temperature refrigerators, that is, refrigerators having both a fresh food storage compartment and a fozen food storage compartment and including separate access doors for each of the compartments are well known. In most of the refrigerators of this type the frozen food compartment is usually a small compartment which can be conveniently located at the top of the cabinet. However the present trend in refrigerator design is to increase the size of the freezer compartment and to reverse the position of the two compartments so that the fresh food compartment is at the top of the cabinet and thus more readily accessible than the freezer compartment.

When the position of the two compartments is so reversed, the freezer compartment being adjacent the bottom of the cabinet receives the least amount of illumination from the usual illuminating means within the room. In addition, one or more sliding shelves, drawers or the like are provided for increased storage area so that food stored on the shelves, etc. may cover up any lamp placed within the compartment and prevent satisfactory illumination of the entire compartment. Furthermore, as substantially the entire wall structure of the freezer compartment acts as an evaporator, any electric lamp arranged for example in a recess in the freezer compartment lining is close to an evaporator coil with the result that frost collects around the lamp and interferes with its operation. Therefore, while some means for illminating the lowermost freezer compartment is desirable, the illuminating means preferably should not be within the freezer compartment.

It is a primary object of the present invention to provide an electric lamp for illuminating the lower compartment of a two compartment refrigerator which lamp is positioned outside that compartment.

A further object of the invention is to provide an electric lamp for illuminating the lower or freezer compartment of a two compartment refrigerator which is mounted exteriorly of that compartment and is operated by means of the door closing the access door to that compartment.

Further objects and advantages of this invention will become apparent as the following description proceeds and the features of novelty which characterize the invention will be pointed out with particularity in the claims annexed to and forming part of this specification.

In carrying out the objects of the present invention, there is provided an electric lamp for illuminating the lowermost or freezer compartment of the two compartment refrigerator which lamp is positioned in the lower edge portion of the door closing the access opening to the upper compartment and which includes switch means, the operation of which is determined by the position of the lower door relative to the upper door.

For a better understanding of the invention, reference may be had to the accompanying drawing in which:

Fig. 1 is a perspective view of a refrigerator cabinet embodying the present invention with a portion of the cabinet broken away; and Fig. 2 is a sectional elevation view of a portion of the cabinet of Fig. 1.

Referring to the drawing there is shown a refrigerator cabinet 1 including an upper door 2 closing the access opening to a fresh food compartment 3 and a lower door 4 closing the access opening to a frozen food compartment 5. These two compartments are separated by a partitioning member 6 having a forward portion or mullion 7 extending across the face of the cabinet between the access openings to the upper compartment 3 and the freezer compartment 5.

The two doors 2 and 4 are of the flush type with the edges thereof overlapping the portions of the cabinet defining the access openings to the two compartments 3 and 5. The upper door 2 comprises an inner wall 8 and an outer wall 9 spaced therefrom with the space between filled with insulation 10. A gasket 11 which is in contact with the face portions of the cabinet surrounding the access opening to the upper compartment 3 and the mullion 7 when the door 2 is closed is provided around the peripheral edges of the inner wall 8 of the upper door.

Similarly the lower door 4 comprises an inner wall 14 and an outer wall 15 spaced therefrom with the space therebetween being filled with insulation 16. Gasket 17 extending around the peripheral edges of the inner wall 14 serves to seal the access opening to the lower compartment 5 when the door is closed.

The upper door 2 has a lower edge portion 18 which is coextensive with and spaced only a short distance from the upper edge portion 19 of the lower door 4 when the two doors are in their closed positions. Also in their closed positions, the edge portions of the two doors are in overlapping engagement with the mullion 7.

Also provided in the freezer compartment are one or more shelves or drawers or other storage members extending entirely across the width of this compartment for the storage of frozen food. During normal use of the freezer compartment, practically the entire volume may be filled with frozen food articles so that it is practically essential that these storage members be slidably mounted in the compartment so that they can be moved part way out of the compartment to provide access to the articles stored on or in the rearmost portions thereof.

In accordance with the present invention there is provided illuminating means for the freezer compartment 5 in the form of an electric lamp 21 mounted in a recess 22 in the lower edge portion 18 of the upper door 2. The circuit for supplying power to the lamp includes conductor 23 and switch means 24. The switch means is also positioned in the lower edge portion of the upper door 2 and includes a pivotally mounted switch operating member 25 for opening and closing the switch 24. This operating member 25 has a rounded or cam-shaped surface projecting downwardly from the lower edge of the upper door 2 and adapted to be engaged by the upper edge 19 of the lower door 4 whenever the upper and lower doors are in the same relative position, as for example, when both of the doors are closed. In that position the operating member 24 is adapted to open the circuit serving the lamp 21. When the two edge portions of the doors are not co-extensive as for example when the lower door is opened and the upper door remains in its closed position the switch actuating member 24 drops downwardly to close the circuit serving the lamp 21 whereupon the illumination from that lamp is directed by the reflector 27 into the freezer compartment 5. The curved or cammed surface on the operating member 26 permits movement of the upper and lower doors in either direction relative to one another. Whenever the two doors are brought into superimposed position the switch member 26 will slide onto or over the door 4 without damage to the operating member 26.

From the foregoing it will be seen that there has been provided by this invention a simple and compact arrangement for illuminating the lower or freezer compartment of a two compartment refrigerator. This illuminating means is positioned outside the freezer compartment and where it cannot be covered up by articles stored in the compartment. Also, the light is in the proper position to illuminate the contents of the shelves or drawers when pulled forwardly from within the compartment.

What we claim as new and desire to secured by Letters Patent of the United States is:

1. A refrigerator cabinet comprising upper and lower storage compartments having separate access openings, a partition wall between said compartments having a forward portion providing a mullion between said access openings, upper and lower doors for respectively closing said access openings having adjacent, normally-coextensive edge portions overlapping said mullion, an electric lamp including a switch therefor mounted in the lower edge portion of said upper door for illuminating the interior of said lower compartment and operating means for said switch including a member normally engaged by the upper edge portion of said lower door to be held in a raised, switch-opening position and adapted to close said switch when either of said doors are opened.

2. A refrigerator cabinet comprising an upper fresh food compartment and a lower freezer compartment having separate access openings, a partition wall between said compartments having a forward portion providing a mullion between said access openings, a plurality of storage members extending across the width of the freezer compartment, upper and lower doors for respectively closing said access openings having adjacent edge portions overlapping said mullion, an electric lamp including a switch means therefor mounted in the lower edge portion of said upper door for illuminating the interior of said lower compartment when said lower door is opened, said switch means including an operating member extending downwardly from the lower edge of said upper door and including a rounded surface for sliding engagement with the upper edge portion of said lower door and adapted to open said switch upon contact with said lower door.

References Cited in the file of this patent

UNITED STATES PATENTS

| | | |
|---|---|---|
| 2,153,851 | Swedman | Apr. 11, 1939 |
| 2,509,611 | Philipp | May 30, 1950 |
| 2,614,719 | Whitmore | Oct. 21, 1952 |